Patented Oct. 15, 1929

1,731,868

UNITED STATES PATENT OFFICE

ARTHUR LYELL RUSHTON AND MERLE M. SIMPSON, OF OMAHA, NEBRASKA, AND HERMAN C. BECKMAN, OF CEDAR LAKE, INDIANA, ASSIGNORS TO CREAM PROCESSES, INC., OF OMAHA, NEBRASKA, A CORPORATION OF DELAWARE

METHOD OF TREATING SOUR CREAM

No Drawing.    Application filed February 27, 1928.    Serial No. 257,554.

The invention relates to improvements in methods of treating sour cream and is particularly adaptable to the treatment of cream which has reached an advanced stage of acidity, and the primary object of our invention is to improve methods of treating cream which has reached an advanced stage of acidity to materially lessen the butter fat losses in churning, and to generally improve the quality of butter produced therefrom.

Much of the cream received by many creameries, especially the so-called centralizers, is received in a relatively sour condition with a total acidity of thirty-hundredths per cent (.30%) or more. In ordinary practice, this cream is first neutralized by an alkaline neutralizer to about twenty-hundredths per cent (.20%), then pasteurized, cooled and sometimes further neutralized. Then it is allowed to ripen or increase its acidity either with or without the addition of lactic acid culture to a total acidity of about twenty-hundredths per cent (.20%) or more and churned. By this process a reasonably uniform product is secured, with the quality of the butter produced depending on the freshness and flavor of the original cream, together with the flavor secured by the use of a lactic acid culture or the generation of acid after neutralizing and before churning.

Cream contains about two to four per cent of "caseous matter", sometimes referred to as albuminoid substances, composed largely of casein and albumin.

In relatively sour cream this caseous matter tends to coagulate or form a curd, and we find that such curds are responsible for much of the excessive butter fat losses in churning, due to the fact that such caseous matter in sour cream entraps the butter fat globules, making it difficult to secure the best results of butter fat separation in churning.

In the treatment of cream, which has become relatively sour before churning, there is therefore present the very serious problem of breaking down or dissolving the curds of caseous matter to free the butter fat globules which are otherwise locked by the curd, so to speak, and are not freed in churning.

Our invention is particularly adapted for use in treating cream gathered in the large centralizing plants from a large number of different sources where considerable portions of the cream have developed a relatively high degree of acidity, resulting in excessive butter fat losses in churning for the reasons stated. We are aware that it has been proposed to reduce the acidity of relatively sour cream containing curds of caseous matter, as described, by introducing into the cream alkaline substances such as lime and sodium carbonate to lower the acidity and subsequently to pass such cream through a centrifugal machine for the purpose of removing some of the solids, not fat, to improve the quality of the cream. Such treatments, however, of relatively sour cream of the described character results in large accumulations of albuminous curd being thrown out against the separator bowl when separation is attempted, resulting in clogging the separator in a very short time, making frequent cleaning necessary, and rendering such method expensive and comparatively impractical on account of excessively high operating costs, and more particularly impractical on account of the excessive losses of the butter fat globules locked in the curds of caseous matter, as aforesaid. When it is attempted to skim or separate the butter fat from relatively sour cream even after the acidity is reduced somewhat by the addition of lime or sodium carbonate, the liquid passing through the skim milk spout of a centrifugal machine carries large quantities of undissolved curd containing locked or entrapped butter fat globules which are lost, and likewise the caseous matter with entrapped or locked butter fat globules lodging against the bowl wall of the separator, which makes the operation of the machine impracticable, are also lost in methods heretofore practiced. Therefore, while the treatment of sour cream as heretofore proposed by the addition of alkaline neutralizers, bringing the acid cream almost down to the neutral point, but stopping short of the neutral point on the acid side thereof, has been used for the purpose of improving the quality of the cream or the butter produced therefrom and has been found in many cases to partially dissolve curds, the expense of such method of treatment, due to the down time of the separator, and the excessive loss of fat in the milk serum has rendered such method of treatment more or less prohibitive and impracticable. Sour cream cannot ordinarily be separated in a centrifugal separator, as is the common practice in subjecting sweet milk for separation to the action of such machine. This is due to the fact that the development of lactic acid in the cream changes the casein to a curdy substance which is thrown out against the separator bowl when separation is attempted under such conditions.

Our invention is based upon our discovery of an alkaline neutralizer and method of applying the same to sour cream of the character described, which substantially, and for all practical purposes dissolves the casein and albuminous curd or curdy particles of the sour cream and frees all fat globules. Sour cream treated according to our process with the casein and albuminous curd or curdy particles substantially and practically dissolved enables us to pass such sour cream so treated successfuly through the ordinary centrifugal machine in considerably larger amounts or over more prolonged periods of operation with a greatly and markedly reduced loss of fat in the skimming operation. Our invention is based upon our discovery that the casein and albuminous curds or curdy particles of sour cream may be substantially and practically dissolved for purposes of centrifugal separation by the application to the sour cream of an excess of a class of alkaline neutralizers known as hydroxides, of which the preferred representative of the class is sodium hydroxide. We have ascertained that potassium hydroxide may be used with certain beneficial results, although sodium hydroxide is more available and more economical. Where, in the claims, we specify an alkali hydroxide, we mean to include equivalents of sodium and potassium hydroxide.

It is an important feature of our invention that in treating the sour cream to substantially and practically dissolve the casein and albuminous curds or curdy particles that the cream is rendered distinctly alkaline. This treatment is contrary to the accepted practice in this art, as it has been heretofore thought undesirable to apply neutralizing materials to sour cream for the purpose of neutralizing all of the acid, because it has been thought that this would result in a cream which would make butter of very inferior flavor and poor keeping qualities and would forfeit the benefits for which cream is ordinarily neutralized. We have discovered that by employing hydroxides, as sodium hydroxide, in treating the sour cream, surprisingly satisfactory results may be secured by rendering the sour cream alkaline, preferably about a six-hundredths per cent (.06%) alkaline expressed as sodium oxide, when sodium hydroxide is used.

In practicing our improved method, the sour cream without any special regard to temperature, the same being at ordinary room or receiving temperature is treated by the addition thereto of a solution of sodium hydroxide and water in the proportion of about three parts of water by weight to one part of sodium hydroxide in either the flake or stick form of commerce. The solution is stirred into the sour cream being thoroughly intermixed therewith until the desired alkalinity, preferably six-hundredths per cent (.06%) calculated as sodium oxide is reached. The cream is then allowed to stand for a period of time, approximately fifteen or twenty minutes, to allow the complete reaction of the alkaline solution upon the cream, after which it is in condition for separation, which can take place at ordinary room temperatures, although we prefer to separate at approximately ninety degrees Fahrenheit, which is approximately the preferred temperature for separating ordinary cream in centrifugal machines. Care should be taken with the alkaline cream to avoid exposure of the same to temperatures in excess of approximately one hundred degrees Fahrenheit to prevent a tendency to a soapy or over-neutralized flavor in butter to be churned therefrom. This process of separation results in a very rich cream being delivered out of the cream spout and the richness, obviously, will be under the control of the operator by the adjustment of the cream screw of the ordinary cream separator. A milk serum thus separated from the cream will be delivered from the milk spout, which may be dried or condensed, or otherwise treated, after its acidity has been restored, precisely the same as buttermilk for drying or condensing. The thick cream, however, produced by our method, is of too high percentage of butter fat for satisfactory commercial churning by ordinary accepted methods of churning. We therefore prefer that such cream as delivered from the centrifugal machine be diluted with either whole milk or skim milk or water to a percentage suitable for churning, which is about a thirty-three per cent fat content cream, whereas, the thick cream produced by our process of skimming treated sour cream will result in a product having a fat content approximately between sixty and eighty per cent. Instead of dilution with whole milk, skim milk or water in the manner described, a satisfactory cream for churning may be produced by mixing the cream produced by our improved method with other lots of thinner untreated sour cream in order to secure a fat percentage suitable for churning. In short, the centrifugally separated cream produced by our method may be reduced to a satisfactory butter fat content for churning by any known method of adding milk serum thereto or any other desired and suitable diluent.

After cream treated by our method in the manner before described has been diluted to put it in condition for churning, it may be ripened by any of the ordinary methods and it may also, if desired, before inoculation or ripening, be pasteurized by any of the known processes of pasteurization and after ripening it will be in condition for churning in the ordinary manner.

Having thus described our invention, what we claim as new and desire to secure by Letters Patent is:

1. The process of treating sour cream which comprises the addition thereto of an alkali hydroxide in sufficient quantity to render the cream distinctly alkaline, and subsequently separating the butter fat product from the cream serum while the cream remains in a condition of alkalinity.

2. The process of treating sour cream which comprises the addition thereto of sodium hydroxide in sufficient quantity to render the cream distinctly alkaline, and subsequently separating the butter fat product from the cream serum while the cream remains in a condition of alkalinity.

3. The process of treating sour cream which comprises rendering the sour cream alkaline by the addition thereto of an alkali hydroxide in quantity sufficient to render the sour cream alkaline and dissolve the caseous matter and subsequently separating the butter fat product from the cream serum prior to the formation of acidity therein sufficient to re-coagulate the caseous matter.

4. The process of treating sour cream which comprises rendering the sour cream alkaline by the addition thereto of sodium hydroxide in quantity sufficient to render the sour cream alkaline and dissolve the caseous matter and subsequently separating the butter fat product from the cream serum prior to the formation of acidity therein sufficient to re-coagulate the caseous matter.

Signed at Omaha, Nebraska this 23rd day of Feb'y, 1928.

ARTHUR LYELL RUSHTON.
   MERLE M. SIMPSON.

Signed at Chicago, Illinois this 21st day of February, 1928.

HERMAN C. BECKMAN.